Sept. 30, 1930.  C. T. MAGILL  1,777,213
SIGNAL CONTROLLING MEANS
Original Filed July 14, 1927
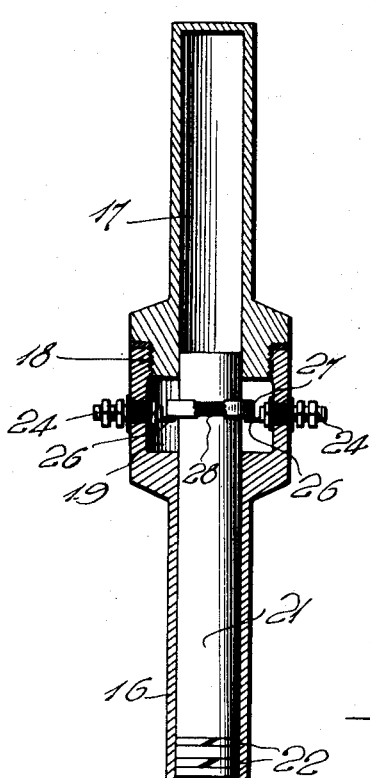
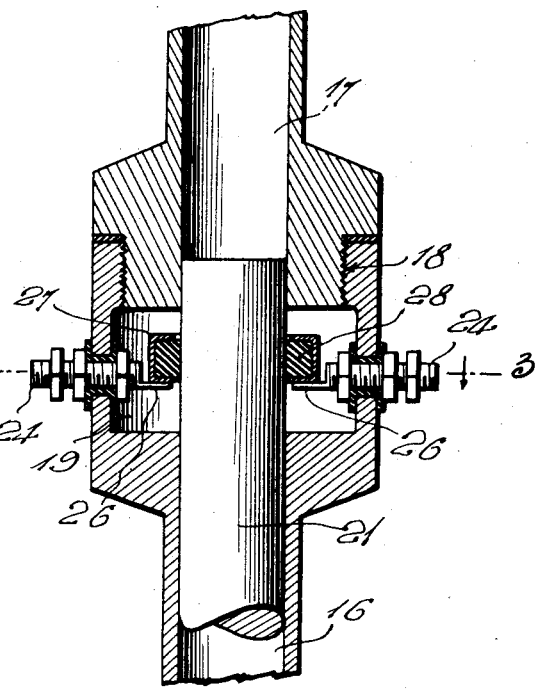
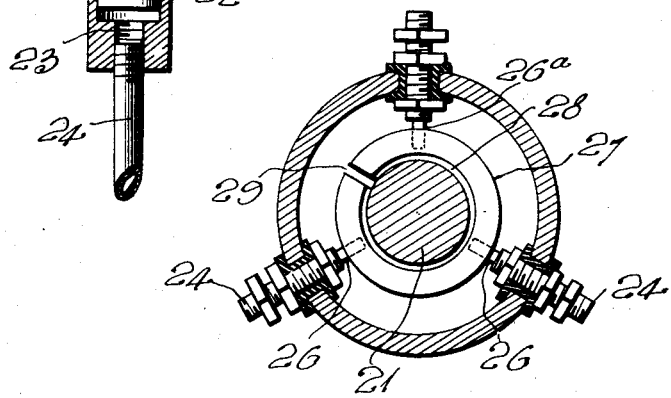
Witness
H. Woodard
Inventor
C. T. Magill
By H. B. Wilson Yeo
Attorneys Patented Sept. 30, 1930

1,777,213

UNITED STATES PATENT OFFICE

CHARLES T. MAGILL, OF CLARKDALE, ARIZONA

SIGNAL-CONTROLLING MEANS

Original application filed July 14, 1927, Serial No. 205,675. Divided and this application filed May 26, 1928. Serial No. 281,334.

This application is a division of my pending U. S. application Serial No. 205,675, filed July 14, 1927.

The parent application relates to a signalling system designed primarily for use on automobiles to give warning to following drivers, that reduction in speed is being made. The present application is devoted to controlling means for the signal, specifically to a signal-operating switch, and it is the object of such invention to provide a switch structure of exceptionally simple and inexpensive nature, yet one which will be highly efficient and desirable and will be sensitive to slight reduction in pressure.

While the invention is primarily intended for use in an automobile speed reduction signal, it is to be understood that it is usable to equal advantage in other fields, for maintaining a signal in one condition under certain circumstances, and for effecting operation of the signal to give a different reading or indication, under other circumstances.

With the foregoing in view, the invention resides in the novel subject matter hereinafter described and claimed, description being accomplished by reference to the accompanying drawing.

Fig. 1 is a vertical sectional view through a signal controlling means constructed in accordance with the present invention.

Fig. 2 is an enlarged vertical sectional view through the central portion of the structure shown in Fig. 1.

Fig. 3 is a horizontal sectional view on line 3—3 of Fig. 2.

In the form of construction shown in the drawing above briefly described, the control means embodies two axially alined cylinders 16—17 having a threaded connection 18 with each other at their inner ends, said inner end of the cylinder 16 being enlarged internally to provide a space 19 within which certain contacts operate. A double ended plunger 21 has its opposite ends mounted in the cylinders 16—17 respectively, and one or both ends of this plunger may be provided with packing rings such as 22. Cylinder 16 is provided with a pressure inlet 23 for connection by a pipe or the like 24 with any pressure-containing system or chamber whose varying pressure is to be relied upon to operate the signal-controlling means. When this pressure is sufficiently great, it forces the plunger 21 toward the cylinder 17 to a greater or lesser extent, according to the strength of such pressure. As plunger 21 moves further into the cylinder 17, it compresses air in the latter, the air pressure thus counterbalancing the pressure in the cylinder 16 and serving to hold the plunger 20 against downward movement as long as sufficient pressure exists in said cylinder 16. As soon as this pressure is reduced however, the air pressure in the cylinder 17 forces the plunger 21 further into the cylinder 16. These pressure-effected movements of the plunger 21, are relied upon to control a signal circuit, of suitable nature, but as this circuit and the signal thereof constitute no parts of the present invention, they have been omitted from the drawing.

Binding posts 24 are provided for current-conducting wires, said posts passing through the enlarged inner end of the cylinder 16 and being insulated therefrom. The inner ends of these binding posts carry contacts 26 of any desired form. These contacts are in the path of a movable signal-controlling or switch member 27 within the chamber 19, said switch member having a frictional engagement with the plunger 21. Preferably, this switch member 27 is in the form of a metallic shell surrounding an insulating ring 28 which surrounds the plunger, said shell and ring being split as at 29 in Fig. 3 and being of self-contracting nature to establish a frictional or slip connection between member 27 and plunger 21.

When there is practically no pressure in the lower cylinder 17, the switch member 27 engages the contacts 26 as shown in Figs. 1 and 2, and the signal circuit is then closed. Upon increase in pressure in the cylinder 16 however, such pressure elevates the plunger 20, causing the ring 28 to elevate the entire switch member 27 out of engagement with the contacts 26 so that the signal circuit will be broken. Upon additional increase of pressure in the cylinder 16, plunger 21 is forced further upward and during such movement, it merely slips or slides through the ring 28, the upward movement of this ring and its shell 27 being limited by the lower end of the cylinder 17. Thus, regardless of the extent of pressure increase, the switch member 27 is held out of engagement with the contacts 26. However, immediately upon reduction of pressure in the cylinder 16, the compressed air trapped in the cylinder 17 by ascent of plunger 21, comes into play to depress this plunger. This descent of plunger 21 brings switch member 27 against the contacts 26, affecting the signal circuit in the desired way.

Preferably, the contacts 26 are spaced apart about 120°, and a "dead contact" 26ª is disposed between them. This arrangement prevents the contacts from having any tendency to cant the ring 28 on the plunger 21 with danger of binding.

Excellent results are obtainable from the general construction shown and described, and such construction is therefore preferably followed. However, it is to be understood that within the scope of the invention as claimed, variations may be made.

I claim:—

1. In a signal controlling means, a pressure controlled signal operating member, a pressure chamber for effecting movement of said member in one direction, and a second chamber in which air is compressed by movement of said member in said one direction, the air so compressed serving to move said member in the other direction upon reduction of pressure in said pressure chamber.

2. In a signal controlling means, a double-ended plunger, two cylinders in which the ends of said plunger are received respectively, one of said cylinders having a fluid inlet to effect sliding of the plunger, the other cylinder constituting an air trap in which air is compressed by said sliding of the plunger, the air so compressed serving to return said plunger.

3. In a signal controlling means, a double-ended plunger, two cylinders in which the ends of said plunger are received respectively, one of said cylinders having a fluid inlet to effect sliding of the plunger, the other cylinder constituting an air trap in which air is compressed by said sliding of the plunger for use to return said plunger, and a signal controlling member having a frictional connection with said plunger to be moved by the latter to a predetermined position and to then permit further movement of the plunger.

4. In a signal controlling means, a double-ended plunger, two cylinders in which the ends of said plunger are received respectively, one of said cylinders having a fluid inlet to effect sliding of the plunger, the other cylinder constituting an air trap in which air is compressed by said sliding of the plunger for use to return said plunger, and a signal controlling ring of self-contracting form frictionally surrounding said plunger to be moved by the latter to a predetermined position and to then permit further movement of the plunger.

5. In a signal controlling means, an operating member, an insulating ring frictionally surrounding said member to be moved thereby, a metal contact shell on said ring, and a stationary contact in the path on which said shell is moved by said ring.

6. In a signal controlling means, a plunger and a pressure cylinder in which it is slidably mounted, said cylinder having an internally enlarged portion receiving a portion of said plunger, fixed contact means within said enlarged cylinder portion, and a switch member in said cylinder portion co-operable with said contact means and having a frictional connection with said plunger.

7. In a signal controlling means, a double-ended plunger, two cylinders in which the ends of said plunger are received respectively, one of said cylinders having a fluid inlet to effect sliding of the plunger, the other cylinder constituting an air trap in which air is compressed by said sliding of the plunger for use to return said plunger, connecting means between the inner ends of said cylinders, fixed contact means carried by said connecting means, and a switch member co-operable with said contact means and having a frictional connection with said plunger.

8. In a signal-controlling means, an operating member and means for effecting movement thereof, a signal-controlling current-conducting contact-engaging switch member carried solely by said operating member and having a frictional slip connection therewith, and a stationary contact in the path in which said switch member is moved by said operating member, said frictional slip connection allowing further movement of said operating member after said switch member comes to rest against said stationary contact.

9. A structure as specified in claim 8, said switch member consisting of a split self-contracting ring surrounding said operating member.

In testimony whereof I have hereunto affixed my signature.

CHARLES T. MAGILL.